3,483,584
WINDSHIELD WIPER SYSTEM
Richard K. Patterson, Jr., Worthington, Ohio, assignor to Ranco Incorporated, Columbus, Ohio
Filed Nov. 15, 1967, Ser. No. 683,209
Int. Cl. B60s 1/08
U.S. Cl. 15—250.02                    4 Claims

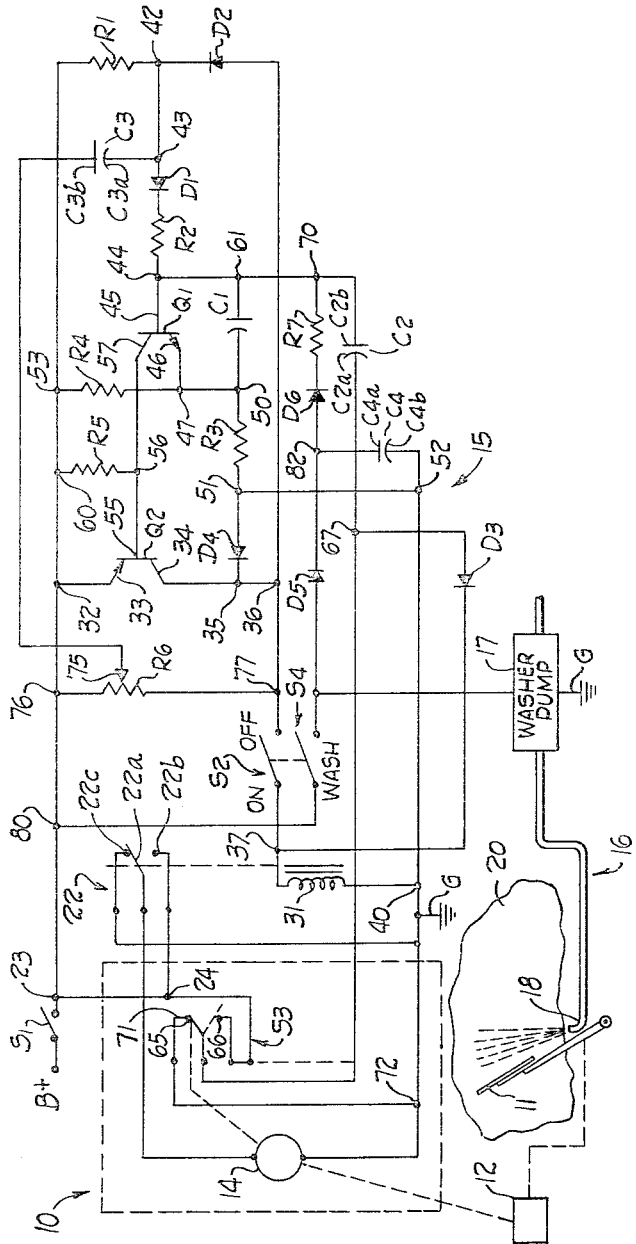

ABSTRACT OF THE DISCLOSURE

A windshield wiper system for an automotive vehicle includes a windshield wiper element, a windshield wiper drive mechanism for cyclically moving the wiper element along a windshield of the vehicle, control circuitry for providing a controllable delay between cycles of the drive mechanism, a windshield washer for directing a fluent washing medium onto the windshield, and circuitry for rendering the control circuit ineffective to delay cycling of the windshield wiper during operation of the windshield washer and for a limited period subsequent to operation of the windshield washer so that the windshield wiper element is operated continuously to insure rapid removal of the washing medium from the windshield.

---

The present invention relates to windshield wiper and cleaning systems for automotive vehicles and the like comprising an oscillating windshield wiper element and in which a windshield cleaning medium applicator mechanism is operative to direct a cleaning medium onto the windshield to cause the windshield wiper element to more effectively clear the windshield of accumulated matter.

Windshield wiper and cleaning systems of the type mentioned are provided with means to regulate the frequency of oscillation of the wiper element to that frequency most effective to remove accumulated moisture, etc., from the windshield in accordance with the rate at which the moisture accumulates. Such systems are referred to as "intermittent" windshield wipers.

A light and gradual accumulation of dirty water on a windshield of an automotive vehicle is often produced by nearby vehicles on a highway, the tires of which cause a mist-like spray of casual water from the road surface which accumulates on a windshield and adversely affects the visibility from the vehicle. In order to prevent impairment of visibility in such circumstances it is common to provide a cleaning medium applicator mechanism or windshield washer which direct a flow of fluent cleaning medium onto the windshield to carry away the dirt, etc. from the windshield when the wiper element makes an oscillation.

In the case of an intermittent windshield wiper of the type referred to, it is possible that the fluent washing medium directed onto the windshield could in itself obstruct the vision of the operator of the vehicle to the same extent as the aforementioned accumulation of dirty water or streaks, if the fluent washing medium is not quickly removed from the windshield. Moreover single oscillation of an intermittent windshield wiper under such conditions can cause severe streaking of accumulated matter and cleaning medium on the windshield, further impairing the operator's vision.

According to the present invention a windshield wiper and washer system of the type referred to is provided having means to selectively control the frequency of oscillations of the wiper element, actuating means to render the cleaning medium applicator mechanism operative, and means for effecting oscillations of the wiper element at a relatively high frequency for a short period following actuation of the applicator mechanism.

In carrying out the present invention a windshield wiper system is provided which includes a windshield wiper element driven by an electrically energized drive motor and drive mechanism, a windshield washer including an electrically energized washer pump which effects a flow of washing medium from a reservoir and onto a windshield of the vehicle, and circuitry for controlling operation of the drive motor and the washer pump. The control circuitry includes a semiconductor switch which is rendered conductive a predetermined, controllable period of time subsequent to completed cycle of the wiper element across the windshield, and a second charging circuit for rendering the semiconductor switch nonconductive at the end of a completed cycle of operation of the windshield wiper element. The washer pump is associated with circuitry for preventing the second charging circuit from rendering the switch nonconductive when the windshield washer is operated and for a brief period after operation of the washer so that the wiper element is continuously cycled and visibility through the windshield is not obstructed as a result of operating the windshield washer.

Other objects and advantages of the present invention will become apparent from a consideration of the following detailed description thereof made with reference to the accompanying drawing which forms a part of the specification and which illustrates a schematic windshield wiper system embodying the present invention.

A windshield wiper system 10 embodying present invention is illustrated in the drawing and includes a windshield wiper element 11, a drive for the element 11 including a drive mechanism 12, and an electric motor 14, preferably of the permanant magnet type, and control circuitry 15 for controlling operation of the motor 14 in a manner which is described in detail presently. The windshield wiper system 10 additionally includes a windshield washer having an electrically energized washer pump 17 communicating with a reservoir of suitable windshield cleaning fluid (not illustrated) and which is effective to direct a stream of the fluid onto a windshield of the vehicle through a suitably constructed nozzle or orifice 18. The washer pump 17 is electrically energized by a manually operated washer control switch connected into the circuitry 15 as is described in greater detail presently.

The windshield element 11 and drive mechanism 12 are driven from the electric motor 14 which is energized through a circuit connected across a power supply, such as a positive terminal B+ of a conventional 12–volt battery, and a ground G (electrically connected to a "negative" or ground terminal of the battery), through an ignition switch S1 of the vehicle, or a switch associated with the ignition. Energization of the motor 14 is controlled by a relay operated switch 22 which establishes and interrupts the energization circuit for the motor 14 in response to operation of the control circuitry 15. The switch 22 includes a moving contact 22a, a fixed contact 22b and a fixed contact 22c and is effective to establish a motor energizing when contacts 22a, 22b are closed. The motor energizing circuit can be traced from the terminal B+ through the switch S1, junctions 23, 24, contacts 22b, 22a of the switch 22, through the motor windings and to ground G. The moving contact 22a is connected to an armature of a relay coil 31 so that the contacts 22a, 22b of the switch 22 are engaged to energize the motor 14 in response to energization of the relay coil 31, and the contacts 22a, 22c, of the switch 22 are engaged when the coil 31 is deenergized so that the motor 14 is stopped.

Energization of the relay coil 31 to close the contacts 22a, 22b, and energize the motor 14 is controlled by closing of a manually operable control switch S2 and conduction of a PNP transistor Q2 forming the output circuit of an operational amplifier, or semiconductor switch, including the transistor Q2 and an NPN transistor Q1 which are interconnected in a manner which is described presently.

When an operator of the vehicle desires to "turn on" the windshield wipers, the control switch S2 is closed to establish an energization circuit for the relay coil 31 from the terminal B+ through the switch S1, junctions 23, 32, emitter 33 and collector 34 of the transistor Q2, junctions 35, 36, the switch S2, a junction 37, the relay coil 31 and a junction 40 connected to the ground G. Energization of the relay coil 31 closes contacts 22a, 22b of the switch 22 and effect energization of the motor 14 to drive the wiper element 11 along the windshield as described.

After the switch S2 is initially closed by an operator of the vehicle, completion and interruption of the energizing circuit for the relay coil 31 is controlled according to the conductive state of the transistor Q2. When the transistor Q2 conducts the relay coil is energized and when the transistor Q2 is nonconductive the relay coil is not energized. The transistor Q1 is regeneratively interconnected to the transistor Q2 so that when the transistor Q1 is rendered conductive the transistor Q2 is substantially immediately rendered conductive to establish the relay coil energizing circuit. Similarly, when the transistor Q1 is nonconducting, the transistor Q2 is immediately rendered nonconductive to interrupt the relay coil energizing circuit to deenergize the motor 14.

The transistor Q1 has its base-emitter, or input, circuit connected across the power supply from the terminal B+, through the switch S1, junction 23, a resistor R1, junctions 42, 43, a diode D1, resistor R2, a junction 44, the base 45, and emitter 46 of the transister Q1, junctions 47, 50, resistor R3, and junctions 51, 52, connected to ground G.

The resistor R3 and a resistor R4 are connected in series between a junction 53, at the voltage of the terminal B+, and the junction 52 to define a voltage dividing network for maintaining a predetermined relatively constant voltage level at the junction 47 connected to the emitter electrode 46 of the transistor Q1. When the voltage level at the base electrode 45 the transistor Q1 exceeds the voltage level at the junction 47 by a predetermined amount, the base-emitter circuit of the transistor Q1 is established and causes transistor action in that transistor to establish a collector-emitter circuit in the transistor Q1 which may be traced from the terminal B+ through the junction 32, emitter 33 and base 55 of the transistor Q2, a junction 56, the collector 57 and emitter 46 of the transistor Q1 and to ground G through the resistor R3 and junctions 51, 52.

Establishment of the emitter-base circuit in the transistor Q2 causes transistor action in that transistor to render the aforementioned emitter-collector, or output, circuit of the transistor Q2 conductive. The emitter-collector circuit of the transistor Q2 is coupled to the base-emitter circuit of the transistor Q1 through the junction 36, and a diode D2 so that when the transistor Q2 is rendered conductive a portion of the output current from the emitter-collector circuit thereof is fed back through the base-emitter circuit of the transistor Q1 to render the transistor Q1 strongly conductive and resulting in the transistor Q2 being rendered fully conductive in a convulsive manner. A resistor R5 is connected between a junction 60 and the junction 56 in the emitter-base circuit of the transistor Q2 and which resistor maintains the base electrode 55 of the transistor Q2 negative with respect to its emitter 33. A capacitor C1 is connected across the base-emitter circuit of the transistor Q1 between the junctions 50, 61 and which is effective to provide a filter which prevents transients in the circuit from rendering the transistor Q1 nonconductive when undesired.

When the manual control switch S2 is closed, the semiconductor switch formed by the transistors Q1, Q2 is immediately rendered conductive as is described presently and the relay coil 31 is energized to close the contacts 22a, 22b of the switch 22 in the energization circuit for the motor 14. Energization of the motor 14 drives the windshield wiper element 11 through the mechanism 12 so that the element 11 makes a reciprocal stroke along the windshield 20 of the vehicle in the usual manner.

The drive motor 14 is drivingly connected to a switch S3 having a moving contact 65 and a stationary contact 66 which contacts are closed when the motor 14 is energized and establish a holding circuit for the relay coil 31 which may be traced from the terminal B+ through the switch S1, junctions 23, 24, contacts 66, 65 of the switch S3, junction 67, diode D3, the junction 37 and to ground through the relay coil 31. The holding circuit prevents the relay coil 31 from being deenergized during a cycle of the windshield wiper element should the control switch S2 be manually opened when the wiper element 11 is away from its normal, "parked" position out of view of the operator of the vehicle. When the wiper element 11 is returned to its parked position, the holding circuit is interrupted by opening of the switch contacts 65, 66 so that if the control switch S2 is opened during a cycle of the element 11, the switch contacts 65, 66 are opened when the element 11 is in its parked position and the relay coil 31 and motor 14 are deenergized. A diode D4 is connected in parallel with the coil 31 and is oriented to protect the circuitry from inductive kicks caused by deenergization of the coil 31.

Closing of the contacts 65, 66 of the switch S3 additionally conditions a charging circuit to terminate conduction of the transistors Q1, Q2 at the end of a stroke of the windshield wiper element. More particularly, closing of the switch contacts 65, 66 establishes a charging circuit for a capacitor C2, traceable from terminal B+ through the switch S3, junction 67 to the plate C2a of the capacitor C2, and from the plate C2b of the capacitor C2 to ground G through junctions 70, 61, 44, and the base-emitter circuit of the transistor Q1. When the motor 14 has driven the wiper element 11 through a complete cycle of its operation and the element 11 is returned to its "parked" position, the motor 14 reopens the contacts 65, 66 of the switch S3 and engages the moving contact 65 with a fixed contact 71 connected to the ground G through a junction 72. Closing of the contacts 65, 71 of the switch S3 connects the plate C2a of the capacitor C2 to ground G. Since the plate C2a of the capacitor C2 is positive to respect to the plate C2b thereof due to charging of the capacitor C2, closing of the contacts 65, 71 of switch S3 abruptly reduces the voltage at the plate C2a to ground and since the voltage across a capacitor cannot change instantaneously, the voltage at the plate C2b remains negative with the respect to that at the plate C2a and thus becomes negative with respect to the ground. With the plate C2b at a negative voltage, the voltage at the base 45 of the transistor Q1 becomes negative with respect to the voltage at its emitter electrode and accordingly the transistor Q1 is rendered nonconductive, resulting in the transistor Q2 being immediately rendered nonconductive to interrupt the energization circuit for the relay 31 and deenergize the motor 14. When the relay coil 31 is deenergized the contacts 22a, 22b of the switch 22 are closed resulting in opposite ends of the field windings of motor M being grounded to cause dynamic braking of the motor 14 which abruptly stops rotation of its armature.

The control circuitry 15 is provided with timing circuitry for reestablishing conduction of the semiconductor switch formed by the transistors Q1, Q2 a variably controllable interval subsequent to deenergization of the motor 14 by the semiconductor switch to provide for intermitten operation of the wiper element. More specifically, the semiconductor switch formed by the transistors Q1, Q2 is rendered conductive to initiate a succeeding cycle of operation of the motor 14 and wiper element 11 after an interval which is controlled by an R-C timing circuit including the resistor R1, a capacitor C3 and a delay adjusting potentiometer R6. The capacitor C3 includes a plate C3a connected to the base-emitter circuit of the transistor Q1 at the junction 43 and a plate C3b which is connected to a wiper 75 of the potentiometer R6. The potentiometer R6 is connected between a junction 76 at the voltage of the terminal B+, and a junction 77 which is connected to the ground G through the switch S2, relay coil 31, and junction 40, so that when the control switch S2 is closed, the plate C3b of the capacitor C3 is maintained at a relatively constant voltage which is fixed by positioning of the wiper 75 of the potentiometer R6.

When the semiconductor switch is rendered nonconductive at the end of a cycle of operation of the wiper element 11 in the manner described, the capacitor C3 is charged from the terminal B+ through the resistor R1, junctions 42, 43 to the plate C3a of the capacitor C3 and from the plate C3b thereof through the wiper 75 of the potentiometer R6 and to ground G through the switch S2 and the relay coil 31. When the voltage at the plate C3a of the capacitor C3 reaches a level which causes the base 45 of the transistor Q1 to be sufficiently positive with respect to its emitter electrode 46, the transistor Q1 is rendered conductive again to establish the energization circuit for the relay coil 31, and the motor 14 is reenergized.

In this regard it should be appreciated that the impedance afforded by the resistor R1 is relatively large so that charging of the capacitor C3 is effected at a gradual rate. Since the voltage level at the plate C3b of the capacitor C3 is fixed by setting the wiper 75 of the potentiometer R6, the amount of time necessary for the capacitor C3 to be charged sufficiently to render the transistor Q1 conductive is controlled by the setting of the potentiometer R6. Accordingly, the wiper 75 of the potentiometer is associated with a suitably constructed knob (not shown) which permits adjustment of the potentiometer by an operator of the vehicle. By adjusting the wiper 75 to provide a relatively low voltage level at the plate C3b of the capacitor C3, a relatively lengthy time period is required for the capacitor C3 to be charged to a level sufficient to render the semiconductor switch conductive for initiating a subsequent cycle of the windshield wiper.

On the other hand, when the potentiometer R6 is set to provide a relatively high voltage at the plate C3b of the capacitor C3, a relatively short period of time is required to increase the voltage level at the plate C3a capacitor C3 to the voltage necessary to render the transistor Q1 conductive. If the voltage at the plate C3b is set at a level which is sufficiently high to render the capacitor Q1 conductive, the transistor Q1 is conductive immediately after completion of the preceding windshield wiper cycle so that cycling of the windshield wiper element 11 is continuous.

It is to be understood that when the ignition switch S1 is initially closed, the capacitor C3 immediately operates the transistors Q1, Q2 conductive but the emitter-collector circuit of the transistor Q2 does not conduct until the control switch S2 is closed, after which the transistors Q1, Q2 are substantially immediately fully conductive. It should also be appreciated that the voltage level at the plate C3a of the capacitor C3 is reduced to the voltage level at the plate C3b when the capacitor C2 terminates conduction of the semiconductor switch and accordingly the charging circuit including the capacitor C2 may be thought of as a "resetting" circuit since the time delay period is reset by its operation.

The windshield wiper system 10 is provided with a windshield washer including the electrically energized washer pump 17 having an energization circuit which is connected across the power supply and established by closing contacts of a normally opened manually operable "wash" switch S4.

Energization of the washer pump 17 is effective to cause the pump to direct a stream of fluent washing medium onto the windshield 20 of the vehicle to permit removal of streaks or other matter which might otherwise impair the vision from the vehicle even though the wiper element is operating. In the preferred embodiment of the invention the wash switch S4 is suitably linked to the control switch S2 so that if the wash switch S4 is closed when the windshield wiper system 10 is deenergized, the switch S2 is closed upon operation of switch S4 thereby preventing operation of the pump 17 independently of the windshield wiper element. The wash switch S4 is preferably constructed to be held in a closed position by the operator until a desired amount of cleaning medium is pumped onto the windshield, with releasing of the switch terminating energization of the pump 17. In the event that the wash switch S4 is closed between intermittent sweeps of the windshield wiper element 11 it is apparent that the stream of washing medium directed upon the windshield could obscure the vision of an operator of the vehicle and result in a hazardous condition.

According to the present invention the windshield wiper system 10 is constructed so that the windshield wiper drive motor 14 is immediately energized upon closing of the wash switch S4 to provide for continuous operation of the wiper element 11 during the time the switch S4 is closed, and for a brief interval after opening of the contacts of the switch S4 to insure that the washing medium is removed from the windshield by the wiper element 11. As illustrated in the drawing, the wash switch S4 connects the capacitor C2 and the base 45 of the transistor Q1 to the terminal B+ when the switch S4 is closed through a circuit which is traced from the terminal B+, through a junction 80, the closed contacts of the switch S4, a diode D5, junction 82, a diode D6, a resistor R7, and to the junction 70 which is connected to the plate C2b of the capacitor C2 and the junction 44 at the base 45 the transistor Q1.

When the switch S4 is closed in an interval between cycles of the windshield wiper element 11, current is supplied to the base-emitter circuit of the transistor Q1 through the closed contacts of the switch S4, diodes D5, D6, resistor R7, and junctions 70, 61, 44, to render the transistor Q1 conductive resulting in immediate energization of the motor 14, as described, to initiate a cycle of the windshield wiper element 11. During the operation of the motor 14 the circuit through the switch S4 is effective to maintain the voltage at the plate C2b of the capacitor C2 at substantially the same level as the voltage provided at the plate C2a thereof through the contacts 65, 66 of the switch S3 from the terminal B+. Thus, closing of the contacts 65, 71 of the switch S3 at the end of a cycle of the element 11 is ineffective to reduce the voltage level at the plate C2b of the capacitor C2 substantially below that of the ground G and base current continues to be supplied to the transistor Q1 at the end of a cycle through the switch S4 so that the semiconductor switch is maintained conductive.

The control circuitry is additionally provided with a charging circuit for maintaining the transistors Q1, Q2 continuously conductive for a brief interval subsequent to opening of the switch S4. Closing of the wash switch S4 provides a charging circuit for a capacitor C4 which is connected between the junction 82, intermediate the diodes D5, D6, and the ground G. When the switch S4 is closed the capacitor C4 is charged through the switch such that the plate C4a thereof is substantially at the voltage of the terminal B+, while the plate C4b of the capacitor C4 is connected to the ground G and is maintained at the voltage of the ground G.

When the operation of the windshield washer 16 is desired to be terminated the switch S4 is opened causing the voltage across the washer pump 17 to fall to zero, terminating the flow cleaning medium to the windshield. At the termination of a cycle of operation of the windshield wiper drive next following opening of the wash switch S4, the contacts 65, 71 of the switch S3 are closed to connect the plate C2a of the capacitor C2 to the ground G, as described, which tends to produce a negative voltage with respect to ground, at the plate C2b of the capacitor C2. The negative voltage level provided at the plate C2b of the capacitor C2 is not effective to terminate operation of the semi-conductor switch due to the capacitor C4 which discharges partially and supplies base current for the transistor Q1 through the diode D6, resistor R7, junctions 70, 61, 44. The capacitor C4 thus maintains the semi-conductor switch in a conductive state and prevents termination of conduction by the capacitor C2 at the termination of the cycle of operation of the windshield wiper drive. The capacitor C4 has a relatively small capacitance and at the termination of succeeding cycles of the windshield wiper drive, the capacitor C4 loses portions of its charge. After a relatively small number of cycles the capacitor C4 is no longer charged to a level sufficient to prevent termination of conduction of the semi-conductor switch and the windshield wiper drive is again operated in an intermittent fashion. Thus the cooperation of the capacitor C4 with the capacitor C2, provides for continuous operation of the windshield wiper drive for a relatively brief period after termination of the operation of the washer pump 17, so that complete removal of the washing medium from the windshield 20 by the wiper element 11 is insured.

In the preferred embodiment the capacitors C4, C2 are of such character that the drive for the wiper element 11 is maintained continuously energized for approximately four complete cycles subsequent to the interruption of the energization circuit for the washer pump 17. It is apparent from the foregoing description that the diode D5 prevents the capacitor C4 from discharging through the washer pump 17 when the switch S4 is opened. The diode D6 prevents the capacitor C4 from being charged during normal operation of the control circuitry, i.e., when the wash switch S4 is open.

While a windshield wiper system of the type described may be constructed from any suitable electrical components the circuitry of a preferred embodiment of the invention has been constructed and successfully operated utilizing components having the following values or designations:

Resistors:
    R1 _____ohms__ 12 meg
    R2 _____do____ 15K
    R3 _____do____ 430
    R4 _____do____ 470
    R5 _____do____ 47K
    R6 _____do____ 10K
    R7

Capacitors:
    C1 _____mf__ 0.1
    C2 _____mf__ 0.22
    C3 _____mf__ 1.0
    C4 _____mf__ 0.15

Diodes:
    D1 _____ IN456a
    D2 _____ IN456a
    D3 _____ IN2069
    D4 _____ IN456a
    D5 _____ IN456a
    D6 _____ IN2069

Transistors:
    Q1 _____ MPS6515
    Q2 _____ MPS6533

Relay coil:
    31 approx. _____ohms__ 50

I claim:
1. A windshield wiper system comprising a windshield wiper element, drive means cyclically operable to effect movement of said element on a windshield, an electrically energized actuator for rendering said drive means operative, control apparatus including semi-conductor switch means for governing operation of said actuator and operative between a conductive and nonconductive condition, time delay circuitry for operating said semi-conductor switch means to one of said conditions wherein said actuator renders said drive means operative, a charging circuit for altering the condition of said switch means from said one condition to its other condition at the termination of a cycle of operation of said drive means and for resetting said time delay circuitry, and washer means for directing a cleaning medium onto the windshield including an electrically actuated pump and a control switch for establishing and interrupting an energization circuit for controlling said pump, said control switch connected to said charging circuit and effective to prevent said charging circuit from altering the condition of said switch means and resetting said time delay circuitry when said pump is actuated so that said drive means continuously cycles when said pump is actuated.

2. A windshield wiper system as defined in claim 1 wherein said washer means further includes a second charging circuit connected to said control apparatus for preventing operation of said first charging circuit for a brief period subsequent to interruption of said energizing circuit for controlling said pump so that said drive means continuously cycles said wiper element subsequent to deenergization of said pump energizing circuit to insure cleaning of said medium from said windshield.

3. A windshield wiper system as defined in claim 1 wherein said semi-conductor switch means includes a semi-conductor element having a control electrode, said first charging circuit including a capacitor connected to said control electrode, said capacitor having a first charged state during a cycle of said windshield wiper element and a second charged state at the end of said cycle to provide a voltage level at said control electrode for altering the conductive state of said semi-conductor element and thereby terminating operation of said drive means, said control switch for said washer pump being effective to prevent said capacitor from being altered from its first to its second state when said washer pump is actuated at the termination of a cycle of said wiper element.

4. A windshield wiper system as defined in claim 3 wherein said washer means further includes a second charging circuit including a second capacitor which is charged from said power supply when said washer pump is actuated and which discharges to said first capacitor to maintain said first capacitor in its first charged state for a brief interval subsequent to said washer pump being actuated.

References Cited

UNITED STATES PATENTS 3,091,792  6/1963  Gute _____ 15—250.17
3,118,164  1/1964  Deibel _____ 15—250.12
3,148,399  9/1964  Ziegler _____ 15—250.02

ROBERT W. JENKINS, Primary Examiner